United States Patent [19]
Jost et al.

[11] Patent Number: 5,029,473
[45] Date of Patent: Jul. 9, 1991

[54] ACCELERATION SENSOR

[75] Inventors: Michael Jost, Unterschleissheim; Walter Weishaupt, Munich, both of Fed. Rep. of Germany

[73] Assignee: Bayerische Motoren Werke AG, Fed. Rep. of Germany

[21] Appl. No.: 349,438

[22] Filed: May 9, 1989

[30] Foreign Application Priority Data

May 10, 1988 [DE] Fed. Rep. of Germany ....... 3815938
Apr. 28, 1989 [DE] Fed. Rep. of Germany ....... 3974053

[51] Int. Cl.⁵ .................................................. G01P 15/00
[52] U.S. Cl. .................................. 73/516 LM; 33/366
[58] Field of Search ............ 73/516 LM, 515, 516 R; 280/734, 735; 340/467, 669; 33/366

[56] References Cited

U.S. PATENT DOCUMENTS

| 3,371,424 | 3/1968 | Sweet | 33/366 |
| 3,464,276 | 9/1969 | Leibert | 73/516 LM |
| 3,863,067 | 1/1975 | Gooley | 33/366 |
| 4,154,000 | 5/1979 | Kramer | 33/366 |
| 4,242,910 | 1/1981 | Stoltz | 73/516 LM |
| 4,531,300 | 7/1985 | Heidel et al. | 33/366 |

FOREIGN PATENT DOCUMENTS

| 2108592 | 9/1971 | Fed. Rep. of Germany . |
| 2142682 | 3/1972 | Fed. Rep. of Germany . |
| 2657738 | 6/1978 | Fed. Rep. of Germany . |
| 3231800 | 3/1984 | Fed. Rep. of Germany . |
| 3604216 | 8/1987 | Fed. Rep. of Germany . |
| 3609841 | 9/1987 | Fed. Rep. of Germany . |
| 793841 | 1/1981 | U.S.S.R. ............................. 280/735 |

OTHER PUBLICATIONS

Three-Page German Search Report.

Primary Examiner—Jerry W. Myracle
Attorney, Agent, or Firm—Evenson, Wands, Edwards, Lenahan & McKeown

[57] ABSTRACT

An acceleration sensor for the automatic triggering of occupant protection systems in vehicles comprises a liquid which is moved in a housing as a function of the acceleration, with a detector which responds to a critical acceleration value. The housing is a level tube which is aligned relative to the acceleration to be determined and contains both the liquid and an indicating medium. The detector responds to the position of the indicating medium, as it moved in the liquid as a function of the acceleration.

19 Claims, 3 Drawing Sheets

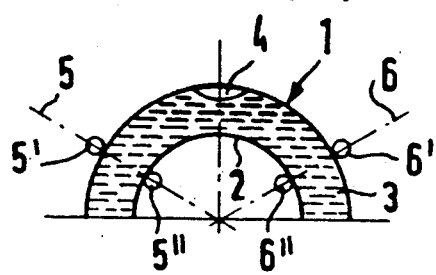
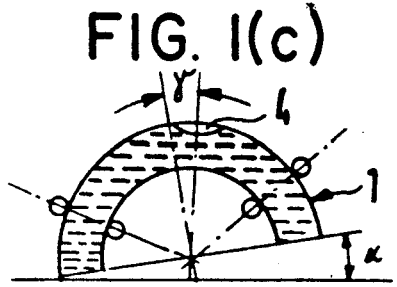
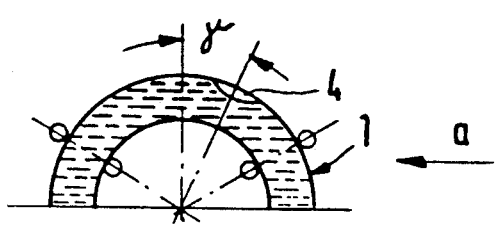
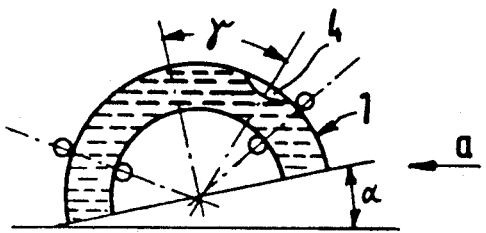
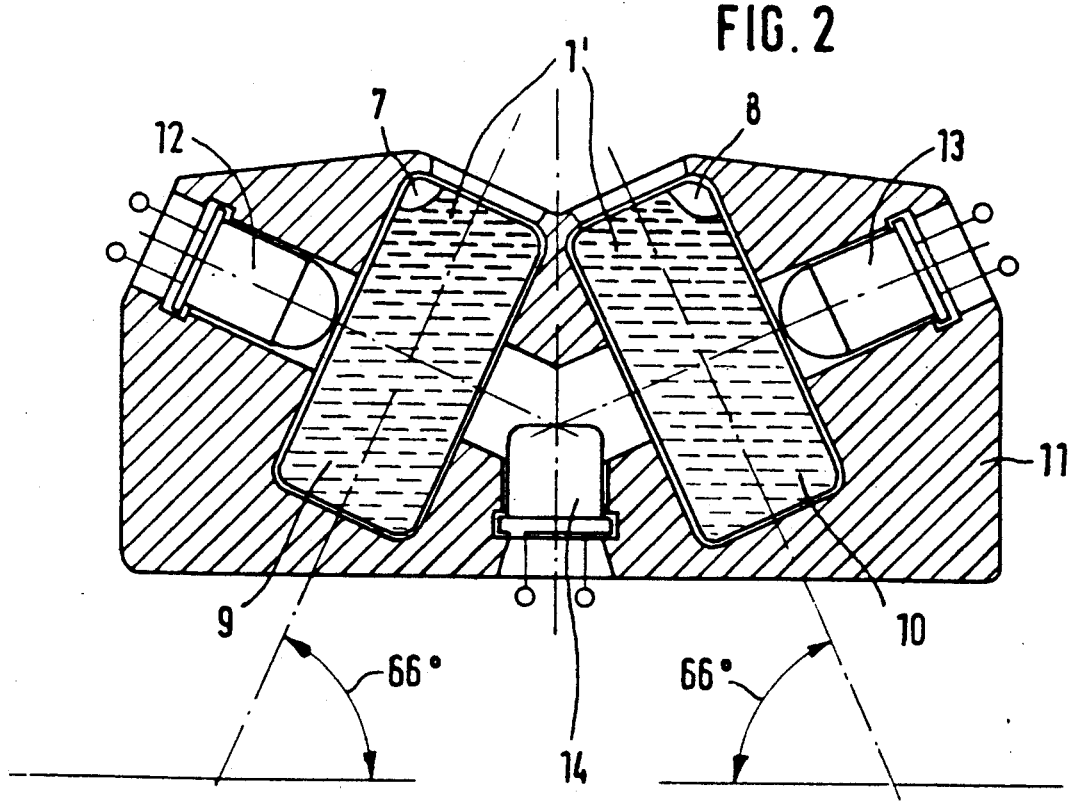

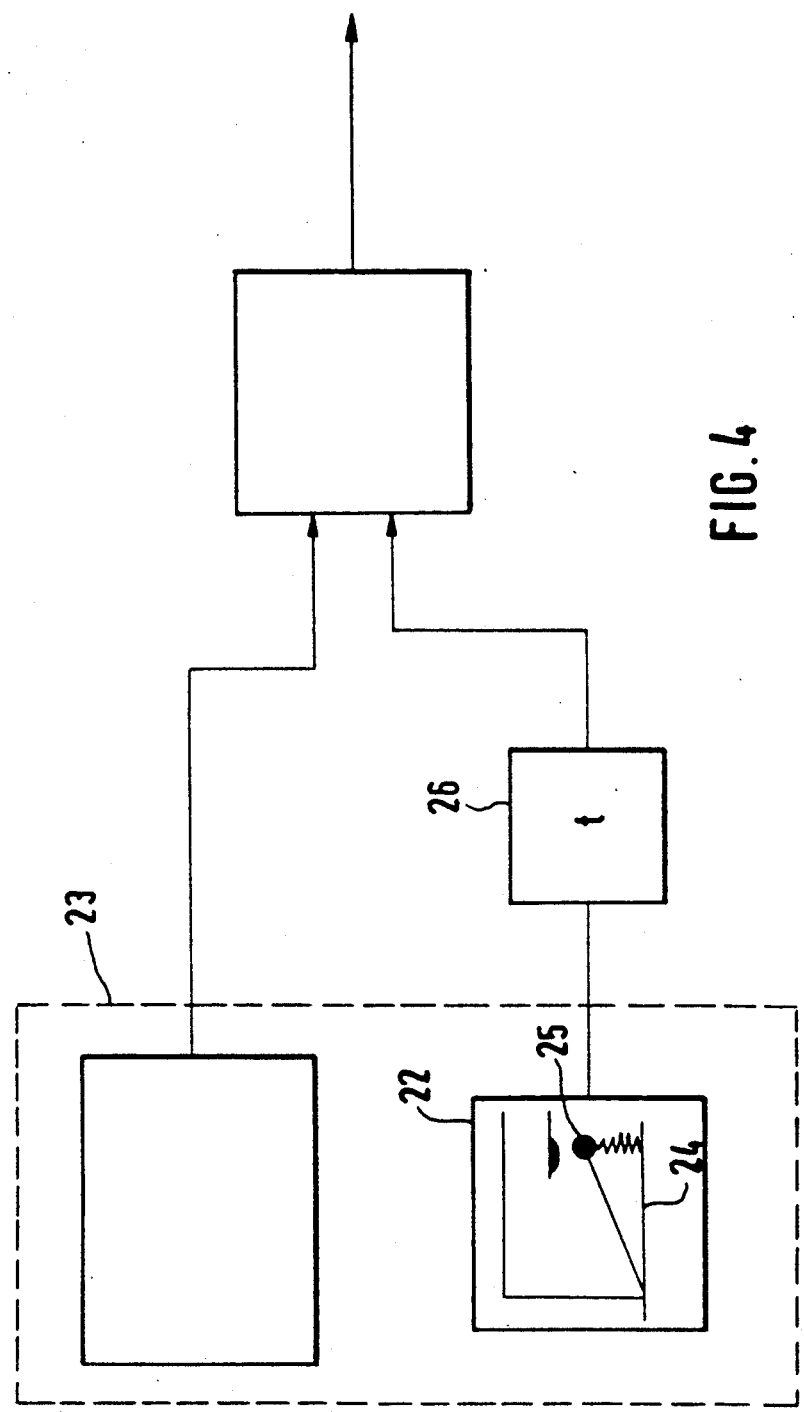

ACCELERATION SENSOR

BACKGROUND AND SUMMARY OF THE INVENTION

The invention relates to an acceleration sensor for vehicles, having a liquid which is moved in a closed-off housing with an indicating medium of lower density and of a lower volume arranged in it and wherein a detector responds to a movement of the liquid.

A sensor of this type is known from German DE-OS 36 09 841 and British Patent 2,022,822. A gas, which is used as the indicating medium, is arranged in a housing which may be pyramidal or conical. In the quiescent condition, this gas is located above the liquid. Accelerations are determined by a transmitter receiver line which extends over the liquid level and in which the transmitter is arranged at the geodetically highest point of the housing. The receivers are located laterally at the housing and receive radiation which is reflected at the surface of the liquid or is refracted by it.

A sensor of this type presents multiple problems. Because of the relatively large mass of the moved liquid and the multiple interactions between it and the housing, the level is subject to constant completely nonuniform and unpredictable movements. As a result, the receivers, for short periods of time, are frequently already exposed to transmitting-power radiation because of the superposition of the multiple movements which, as a rule, are relatively undamped, although the acceleration to be detected is far below a critical limit value. A sensor of this type can therefore only be used to a limited extent. This limitation applies to the triggering of a vehicle occupant protection system, such as an airbag or a rollover bar, which may be irreversibly triggered only when an actual critical acceleration value is present.

For a sufficient effectiveness, the known sensor requires additional electronic devices which eliminate the mentioned disturbing influences. However, as a rule, this is possible only by filters and integrating elements. Both require certain time-related expenditures, with the result that a sensor of this type is not uncritical concerning its time-related ability to respond.

The invention is based on the object of providing a sensor of the initially mentioned type which has a simple construction and permits a reliable and fast recognition of an acceleration value to be detected.

The invention achieves this object by use of a level tube as the housing and by having the tube aligned relative to the acceleration to be determined. The detector responds to a defined position of the indicating medium within the liquid, when this indicating medium takes up a position indicating the acceleration value to be determined.

It is essential for the present invention that the indicating medium move within the fluid as a function of the acceleration. Vibrations, to the extent that they can occur in the liquid at all, have no influence on the movement and the position of the indicating medium, since the liquid compensates for these vibrations in itself. The position of the indicating medium therefore supplies a precise indication of the acceleration to be detected. This is particularly true when the difference in density between the liquid and the indicating medium is sufficiently large. The adjustment of the indicating medium is determined by the resulting acceleration of the liquid. This acceleration is composed of the gravitation and of the possibly existing dynamic acceleration components of the liquid in the direction determined by the alignment of the level and supplies the lift for the indicating medium.

The sensor may be constructed in a plurality of ways. Thus, it may be a conductivity sensor, which dips into an electrically conductive liquid. With respect to its conductivity, the indicating medium differs from that of the liquid and may, for example, have no conductivity. The sensor will then be arranged such that, at the acceleration value to be detected, the indicating medium is located at the location of the sensor. As a result, the value of the acceleration, in this case, is recognized by the jump in conductivity.

Another particularly advantageous construction development of the sensor consists of a transmitter receiver line for electromagnetic or acoustic waves which is aligned such that, at the acceleration value to be detected, the indicating medium is located at its transmission line. This results in a change of the damping of the transmitter receiver line. As a rule, the damping will then increase. This is caused by the double passage of the radiation through the boundary layer between the liquid and the indicating medium.

As a result of this simple construction, it is also possible to determine several differently directed acceleration components by the use of a corresponding number of such sensors. Here, each of the sensors is used for determining the relevant acceleration in the pertaining direction. By a corresponding alignment orientation of sensors, it is also possible to select a number of sensors which is lower than the number of the acceleration components to be determined.

A further development of the invention is possible by developing the housing for the sensor as a straight level tube which is inclined with respect to the acceleration to be determined. If, for example, an acceleration in the longitudinal direction of the vehicle is to be determined, the tube is inclined with respect to the longitudinal direction. In the quiescent position, or in the case of a no-acceleration movement of the vehicle, the indicating medium is located at the geodetically highest point of the tube, and in the case of an additional acceleration, is determined from the vectorial addition of the gravitation and the dynamic acceleration of the liquid which supplies the lift for the indicating medium.

By a sensor which is constructed in this manner, it is also possible to determine several acceleration components which extend vertically with respect to one another. For this purpose, the tubes are aligned in the direction of a common vertex. The transmitter receiver lines of the individual sensors extend in the direction of a common end point which, for the individual tubes, is also the zenith point of the vertex with respect to the plane in which the acceleration components ar located.

Other devices for improving the operation of the acceleration sensor is to have an additional moving-condition sensor which is connected independently of the acceleration sensor via an OR gate to trigger an occupant protection system when the motor vehicle is in a condition which approaches weightlessness. This connection can utilize a time delay wherein the occupant protection system is triggered when the vehicle is in the condition which approaches weightlessness, for longer than a set switching time (t). The moving-condition sensor can be a distance meter which determines the distance of the motor vehicle from a road surface, or it can respond to the vertical acceleration or a wheel rebound. The acceleration sensor and moving condition sensor can be housed in a compact constructional unit. The devices are also used for triggering an occupant protection system when the vehicle is in a condition which at least approaches weightlessness and which is therefore particularly critical.

In the case of weightlessness, the acceleration values in the vehicle are relatively low. Nevertheless it is necessary during a free fall, that the occupant protection system be triggered because, at the end of the weightless state, extremely high acceleration values will frequently occur (impact). The invention provides that the occupant protection system becomes operative as early as during the weightless state, in order to provide a sufficient protection of the vehicle occupants at the end of weightlessness.

Since occasionally a condition of the motor vehicle which approaches weightlessness is reached during the normal driving operation, a time delay feature on the weightlessness input is used for differentiating between such "normal" and "critical" situations. In order to avoid these types of situations which may occur when driving over a hump and in order to ensure that the occupant protection system is not triggered unnecessarily, the duration of the critical condition is determined by a time function element. If this weightlessness time duration is short the occupant protection system must not be triggered.

During the state of weightlessness a distance meter can determine a distance from the ground which is clearly above the normal value. During a state of weightlessness, the sensor for the vertical acceleration furnishes a value which is close to zero. Additionally, the rebound of one or several vehicle wheels, if it is equal to the maximally possible value, is also a good indication of the state of weightlessness.

Although a safety system for a rollover bar of a motor vehicle, which is controlled by a wheel rebound sensor, is known from DE-PS 35 45 874, in contrast to the invention, the state of the free fall is not taken into account because the signal of the wheel rebound sensor becomes operative only when, at the same time, an inclination switch responds which is actuated when a certain inclination is exceeded. However, in the case of a state of weightlessness, there is frequently no functional connection with the inclination of the motor vehicle. Accordingly, the instant invention provides a time delay for the weightlessness control and does not use an inclination input.

Other objects, advantages and novel features of the present invention will become apparent from the following detailed description of the invention when considered in conjunction with the accompanying drawings.

BRIEF DESCRIPTION OF THE DRAWINGS

FIG. 1a–d show a first embodiment of a sensor according to the invention indicating several different acceleration values;

FIG. 2 shows an alternative embodiment of the sensor of FIG. 1 for two oppositely identical acceleration values;

FIG. 4 is a view of a schematic showing of a fourth embodiment, in which the state of weightlessness is also taken into account.

DETAILED DESCRIPTION OF THE DRAWINGS

Figure 3:
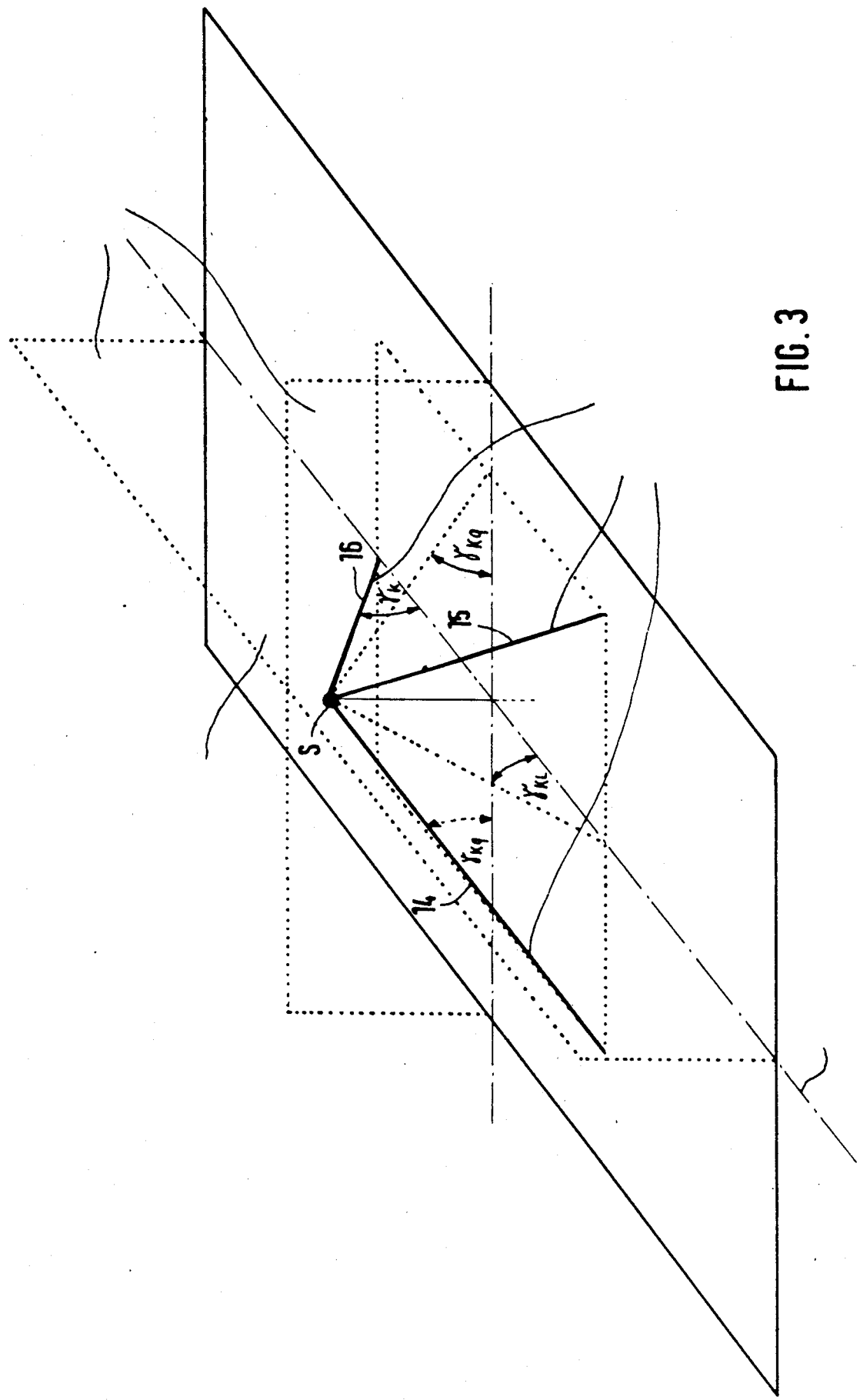
FIG. 3 is a schematic view of a third embodiment of the sensor used for the determination of a rollover and of an extreme acceleration in longitudinal direction of the vehicle.

In the embodiment of FIG. 1, a circular level tube 1 is used as the acceleration sensor of a vehicle in connection with a safety device, such as an airbag or a rollover bar, for recognizing a critical acceleration value. It is possible to use this sensor for recognizing the longitudinal or transverse force connection with a device for the roll and level stabilization.

The level tube 1 consists essentially of a housing 2 with a liquid 3 which is arranged in it. This liquid may be water or alcohol which remains in a liquid state under conventional operating conditions of the motor vehicle. An indicating medium is located in the liquid 3, which has a lower specific density and a significantly lower volume than the liquid 3 and does not react with it chemically or physically.

The indicating medium, which commonly is a so-called air bubble 4, seeks the highest point in the tube as a function of the acceleration. Without any dynamic accelerations, this is the geodetically highest point. This is shown in FIGS. 1a and 1c for a flat and inclined position of the sensor, respectively.

If a dynamic transverse-acceleration component in the direction of the level tube 1 occurs, the adjustment of the air bubble 4 is obtained from a vectorial addition of gravitation and this acceleration component. This position adjustment is shown in FIGS. 1b and 1d for a transverse-acceleration component in the direction of an arrow a.

The position of the air bubble 4 is detected by a transmitter receiver line 5 and 6 with transmitters 5' and 6' and their receivers 5" and 6", respectively. The position of the lines 5 and 6 is such that at the value of the acceleration to be detected, the air bubble 4 is displaced to a position just entering into one of these lines 5 and 6 and as a result, significantly changes the damping of the received radiation received at the respective receiver.

If it is required that several transverse-acceleration components, which extend in the same direction, are necessary to be determined, several transmitter receiver lines corresponding to lines 5 and 6 may be arranged at the level tube 1 in the corresponding positions.

In the embodiments of FIG. 2, there are two straight level tubes 1'. Instead of being circular, the level tubes 1', are adjusted at an angle (in this case: 66°o) at which the motor vehicle will role over. Inside level tubes 1', air bubbles 7 and 8 are in each case provided and which experience a lift with respect to the liquid 9 and 10 inside levels tubes 1'.

Level tubes 1' are disposed in a housing 11 containing two light-emitting diode transmitters 12 and 13 arranged together with a common receiver 14. During an acceleration of the level tubes 1' resulting from a dynamic and/or a static acceleration which reaches a critical value, the transmitter receiver lines existing between the transmitters 12 and 13 and the receiver 14 will be interrupted. As a result, the receiver 14 receives a signal which is correspondingly changed in its intensity. This signal may be used as a triggering signal for a safety device, such as a rollover bar which can be moved into protective position by said signal. By an interlaced timing of the transmitters 12 and 13, the side may also be detected toward which the rollover of the vehicle is imminent.

By an installing of the level tubes 1', turned by 90° with respect to the longitudinal direction of the vehicle, the sensor device shown in FIG. 2 may also be used for detecting accelerations in, for example, the longitudinal direction of the vehicle for triggering an airbag.

In the embodiment of FIG. 3, three level tubes corresponding to the level tubes 1' of FIG. 2 (not shown), are arranged in an inclined position with respect to one another and have a common vertex S in the direction of the drawn straight lines 14, 15 and 16. The inclinations of the three level tubes are such that the projected angles of inclination of the level tubes on the main planes, which extend vertically with respect to the longitudinal and transverse axis, are equal to the critical angles for a rollover in longitudinal and transverse direction. This makes it possible to use only three level tubes instead of the four level tubes which appear to be required initially. Also, during the timed transmitting operation of corresponding transmitters, which may be arranged laterally of the level tubes to act upon a common receiver which is arranged at the foot of the perpendicular line from the vertex S to the datum plane, the direction may be detected into which the rollover acceleration is taken place. Correspondingly, a suitable safety device can be brought into the proper position or can be made operative in response to this detected direction.

FIG. 4 shows a control arrangement for an occupant protection system which can be triggered by an accelerating sensor 21 and independently of this sensor 21, by a moving-condition sensor 22. This is symbolized by an OR-element. The acceleration sensor can be of the level tube type of any one of FIG. 1, FIG. 2 or FIG. 3.

The moving-condition sensor 22 may, for example, respond to the vertical acceleration of the motor vehicle and, together with the sensor device 21, may be constructed as a compact constructional unit 23. In the simplest case, the sensor 22 will be a scale 24, by which the weight of the mass body 25 is determined.

Under normal driving conditions, the scale 24 indicates a value which fluctuates around the value of the actual weight. The fluctuations are caused by temporary, relatively low vertical accelerations which the motor vehicle experiences during the driving operation.

When the motor vehicle loses the contact with the ground, a moving condition occurs which is at least similar to that of weightlessness. The scale 24 will now furnish a value which in the "ideal case", i.e., in the undisturbed free fall, is equal to zero or is located around this value within a small value range.

The control arrangement therefore recognizes the condition of weightlessness. If this condition lasts for a certain time, for example, for 100 msec., the control arrangement will trigger an airbag or a rollover bar and render it operative. The indicated time duration is determined by a time function element 26 to which the output signal of the scale 24 is guided.

The triggering of the occupant protection system by the moving-condition sensor 22 takes place independently of the possible triggering by the acceleration sensor 21 and thus also when this acceleration sensor 21 determines no critical value of the measured acceleration. It is therefore ensured that under all possible moving conditions of the motor vehicle, the safety system is triggered in time and thus reliably carries out its function.

Instead of using the shown scale-type driving-condition sensor 22, a distance meter (not shown) which determines the distance of the motor vehicle from the road surface, or a wheel rebound sensor, which responds in the case of a maximally rebound vehicle wheel could be used. This one can recognize that the motor vehicle has lost contact with the road surface or has a contact with the road surface which is only very slight and therefore is approaching the condition of a free fall.

What is claimed:

1. An acceleration sensor for vehicles, comprising:
   a closed housing;
   a liquid movable in said closed housing;
   an indicating medium of lower density and a lower volume than said liquid;
   said indicating medium movably arranged in said liquid;
   a detector which is aligned relative to the closed housing to sense an acceleration to be determined, wherein the closed housing is a straight level tube inclined with respect to the acceleration to be determined.

2. A sensor according to one of claim 1, wherein the closed housing has several closed housings, each determining accelerations in different directions.

3. A sensor according to claim 2, wherein each closed housing comprises a level tube, which tubes are aligned in the direction of a common vertex.

4. A sensor according to claim 3, wherein the transmitter receiver lines comprises two transmitters and a common receiver.

5. An acceleration sensor for vehicles, comprising:
   a closed housing;
   a liquid movable in said closed housing;
   an indicating medium of lower density and a lower volume than said liquid;
   said indicating medium movably arranged in said liquid;
   a detector which is aligned relative to the closed housing to sense an acceleration to be determined, wherein the detector is a transmitter-receiver for one of electromagnetic and acoustic waves, the indicating medium is located between a transmitter and receiver element of said transmitter-receiver at the acceleration to be determined, and the closed housing is a straight level tube inclined with respect to the acceleration to be determined.

6. A sensor according to one of claim 5, wherein the closed housing has several closed housings, each determining accelerations in different directions.

7. A sensor according to claim 6, wherein each closed housing comprises a level tube, which tubes are aligned in the direction of a common vertex.

8. A sensor according to claim 7, wherein the transmitter receiver lines comprises two transmitters and a common receiver.

9. An acceleration sensor for vehicles comprising:
   a closed housing;
   a liquid which is movable in said closed housing;
   an indicating medium of lower density and a lower volume than said liquid;
   said indicating medium movably arranged in said liquid;
   a detector which is aligned relative to the closed housing to sense at least one of a static acceleration and dynamic acceleration to be determined;

and wherein said detector responds to a defined position of the indicating medium within the liquid when said indicating medium takes up its position at the acceleration to be determined, wherein the closed housing has several closed housings, each determining acceleration in different directions.

10. A sensor according to claim 9, wherein the detector is a transmitter receiver for one of electromagnetic and acoustic waves, and the indicating medium is located between a transmitter and receiver element of said transmitter-receiver at the acceleration to be determined.

11. A sensor according to one of claim 10, wherein the closed housing has several closed housings, each determining accelerations in different directions.

12. An acceleration sensor for vehicles, comprising:
a closed housing;
a liquid movable in said closed housing;
an indicating medium of lower density and a lower volume than said liquid;
said indicating medium movably arranged in said liquid;
a detector which is aligned relative to the closed housing to sense an acceleration to be determined, wherein an additional moving-condition sensor is provided and connected with the detector through an OR-gate to a vehicle occupant protection system for triggering the protection system when the motor vehicle is in a condition which approaches weightlessness.

13. A sensor according to claim 12, wherein a time function delay means is connected between the moving-condition sensor and the OR-gate so that the occupant protection system is triggered when the vehicle is in the condition which approaches weightlessness, for longer than a switching time set by the delay means.

14. A sensor according to claim 13, wherein the moving-condition sensor is a distance meter which determines the distance of the motor vehicle from a road surface.

15. A sensor according to claim 13, wherein the moving-condition sensor responds to a vertical acceleration.

16. A sensor according to claim 13, wherein the moving-condition sensor is a wheel rebound sensor.

17. A sensor according to claim 12, wherein the moving-condition sensor is a distance meter which determines the distance of the motor vehicle from a road surface.

18. A sensor according to claim 12, wherein the moving-condition sensor responds to a vertical acceleration.

19. A sensor according to claim 12, wherein the moving-condition sensor is a wheel rebound sensor.

* * * * *